(12) United States Patent
Ingram et al.

(10) Patent No.: US 10,241,688 B2
(45) Date of Patent: Mar. 26, 2019

(54) I/O AMPLIFICATION FOR DETERMINING TO INCREASE WORKLOAD

(71) Applicant: International Business Machines Corporation, Armonk, NY (US)

(72) Inventors: Samuel K. Ingram, Fulshear, TX (US); Sergio Reyes, Austin, TX (US); Brian C. Twichell, Austin, TX (US); Yijie Zhang, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/454,151

(22) Filed: Mar. 9, 2017

(65) Prior Publication Data
US 2018/0260143 A1 Sep. 13, 2018

(51) Int. Cl.
| | | |
|---|---|---|
| G06F 3/06 | (2006.01) | |
| G06F 13/16 | (2006.01) | |
| G06F 17/30 | (2006.01) | |

(52) U.S. Cl.
CPC .......... G06F 3/0613 (2013.01); G06F 3/0604 (2013.01); G06F 3/065 (2013.01);
(Continued)

(58) Field of Classification Search
CPC .... G06F 3/0604; G06F 3/0611; G06F 3/0613; G06F 3/0619; G06F 3/0629; G06F 3/0631; G06F 3/0638; G06F 3/064; G06F 3/065; G06F 3/0653; G06F 3/0659; G06F 3/0673–3/0679; G06F 12/06; G06F 12/0615; G06F 12/0646; G06F 12/109; G06F 13/1642; G06F 2212/652; G06F 2212/656; G06F 2212/657; G06F 9/5061;
(Continued)

(56) References Cited

U.S. PATENT DOCUMENTS 5,953,689 A * 9/1999 Hale ............... G06F 3/0605
702/182
6,314,501 B1 * 11/2001 Gulick ............... G06F 9/54
711/153
(Continued)

OTHER PUBLICATIONS

G. A. Di Lucca and A. R. Fasolino, "Testing Web-based Applications: The state of the art and future trends", Information and Software Technology, vol. 48, Is. 12, 2006, pp. 1172-1186 (Year: 2006).*

(Continued)

*Primary Examiner* — Reginald G Bragdon
*Assistant Examiner* — Aaron D Ho
(74) *Attorney, Agent, or Firm* — Jared L. Montanaro (57) ABSTRACT

An amplification number may be input into a storage subsystem interface. A processor in a storage system may receive an original input/output (I/O) request from an application. The processor may determine, in response to the amplification number being input, to duplicate the original I/O request one or more times. The processor may generate one or more duplicate I/O requests of the original I/O request. The processor may store the original I/O request in a general address space in the storage subsystem. The processor may store the one or more duplicate I/O requests in a reserved address space in the storage subsystem. The processor may execute the original I/O request and the one or more duplicate requests.

16 Claims, 6 Drawing Sheets

(52) U.S. Cl.
CPC .......... *G06F 3/0619* (2013.01); *G06F 3/0659* (2013.01); *G06F 3/0676* (2013.01); *G06F 13/1642* (2013.01); *G06F 17/30899* (2013.01)

(58) Field of Classification Search
CPC ...... G06F 9/5077; G06F 9/5083; G06F 11/30; G06F 11/3034; G06F 11/3409; G06F 11/3414; G06F 11/3433; G06F 11/3442; G06F 11/3447; G06F 11/3457; G06F 11/3461; G06F 11/3495; G06F 17/30861; G06F 17/30873; G06F 17/30876; G06F 17/3089; G06F 17/30899; G06F 17/30905; G06F 17/30994; G06F 11/3466; G06F 3/0676
USPC ............. 711/112, 162; 710/1, 3–5, 9–11, 15, 710/17–20, 26, 36, 37, 60, 74; 702/81–84, 182, 186
See application file for complete search history.

(56) References Cited

U.S. PATENT DOCUMENTS

| | | | | |
|---|---|---|---|---|
| 6,480,941 | B1* | 11/2002 | Franke | G06F 12/0284 710/317 |
| 6,578,128 | B1* | 6/2003 | Arsenault | G06F 12/0284 711/202 |
| 6,760,684 | B1 | 7/2004 | Yang et al. | |
| 6,889,159 | B2 | 5/2005 | Klotz et al. | |
| 7,058,764 | B2* | 6/2006 | Bearden | G06F 12/0866 710/1 |
| 7,114,106 | B2 | 9/2006 | Klotz et al. | |
| 7,114,112 | B2 | 9/2006 | Griffin et al. | |
| 7,231,606 | B2* | 6/2007 | Miller | H04L 43/50 702/186 |
| 7,334,062 | B1* | 2/2008 | Agarwal | G06F 9/5016 709/226 |
| 7,526,680 | B2* | 4/2009 | Mathew | G06F 11/3409 714/32 |
| 7,530,071 | B2* | 5/2009 | Billau | G06F 9/5072 710/36 |
| 7,743,375 | B2* | 6/2010 | Goodman | G06F 12/0646 709/215 |
| 7,930,163 | B2 | 4/2011 | Everhart et al. | |
| 8,392,890 | B2* | 3/2013 | Miller | G06F 11/3688 714/25 |
| 9,021,362 | B2* | 4/2015 | Broda | G06F 11/3495 715/736 |
| 9,229,842 | B2* | 1/2016 | Broda | G06F 11/3495 |
| 9,294,296 | B2* | 3/2016 | Kirschnick | G06F 11/3414 |
| 9,436,579 | B2* | 9/2016 | Broda | G06F 11/3409 |
| 9,558,465 | B1 | 1/2017 | Arguelles et al. | |
| 2004/0015755 | A1* | 1/2004 | Klotz | G06F 11/2294 714/719 |
| 2004/0068680 | A1* | 4/2004 | Mohammad | G11C 29/56 714/42 |
| 2006/0136579 | A1* | 6/2006 | Linville | G06F 11/3688 709/223 |
| 2009/0055522 | A1* | 2/2009 | Shen | G06F 11/3433 709/224 |
| 2013/0054792 | A1* | 2/2013 | Sharaf | G06F 8/20 709/224 |
| 2014/0173415 | A1* | 6/2014 | Kattil Cherian | G06F 17/30861 715/234 |
| 2017/0242592 | A1* | 8/2017 | Camp | G06F 3/0605 |

OTHER PUBLICATIONS

B. M. Subraya and S. V. Subrahmanya, "Object driven performance testing of Web applications," Proceedings First Asia-Pacific Conference on Quality Software, Hong Kong, China, 2000, pp. 17-26. (Year: 2000).*

Accelerated Examination Support Document, U.S. Appl. No. 15/714,553, signed Sep. 12, 2017, 14 pgs.

Ingram et al., "Disk I/O Amplification Modeling," U.S. Appl. No. 15/714,553, filed Sep. 25, 2017.

List of IBM Patents or Patent Applications Treated as Related, Sep. 18, 2017, 2 pgs.

Ganger et al., "The DiskSim Simulation Environment," Version 1.0 Reference Manual, CSE-TR-358-98, The University of Michigan, Feb. 27, 1998, 59 pgs.

Intellimagic, "Disk Magic," Optimize Current and Future Disk Subsystem Investments, Storage Intelligence, www-304.ibm.com/partnerworld/gsd/showimage.do?id=25691, 4 pgs., © IntelliMagic 2008.

Mell et al., "The NIST Definition of Cloud Computing," Recommendations of the National Institute of Standards and Technology, U.S. Department of Commerce, Special Publication 800-145, Sep. 2011, 7 pgs.

Unknown, "NETEM(8)" http://man7.org/linux/man-pages/man8/tc-netem.8.html, 5 pgs, printed Mar. 6, 2017.

Zhang et al., "Synthesizing Representative I/O Workloads for TPC-H," Software, IEEE Proceedings-, IEEE, 2004, 10 pgs.

* cited by examiner

I/O AMPLIFICATION FOR DETERMINING TO INCREASE WORKLOAD

BACKGROUND

The present disclosure relates generally to the field of application performance, and more specifically to monitoring the impact workload and physical storage have on an application.

A user may want to determine the maximum workload an application may be able to handle before the input/output (I/O) requests that the physical storage may be able to handle impede the performance of the application. The application may send too many I/O requests to the physical storage, which may result with the physical storage processing the I/O requests in an unacceptable amount of time. The processing of I/O requests may be at the detriment of the application by causing the application to function improperly.

SUMMARY

Embodiments of the present invention disclose a method, system, and computer program product for identifying the observable effects increased input/output (I/O) requests have on an application. An amplification number may be input into a storage subsystem interface. A processor in a storage subsystem may receive an original I/O request from an application. The processor may determine, in response to the amplification number being input, to duplicate the original I/O request one or more times. The processor may generate one or more duplicate I/O requests of the original I/O request, wherein the amount of the one or more duplicate I/O requests may correspond to the amplification number. The processor may store the original I/O request in a general address space in the storage subsystem. The processor may store the one or more duplicate I/O requests in a reserved address space in the storage subsystem. The processor may execute the original I/O request and the one or more duplicate I/O requests.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of application performance, and more specifically to the impact workloads and physical storage (e.g., storage subsystems, hard-drives, flash drives, etc.) have on the application. While the present disclosure is not necessarily limited to such applications, various aspects of the disclosure may be appreciated through a discussion of various examples using this context.

Physical storage resources assigned to a software application can strongly influence the behavior of the application. To ensure the application continues to work properly during workload spikes, a user may over-purchase hardware to process the influx of input/output (I/O) requests. Before over-purchasing hardware (e.g., purchasing more or new hardware) a user may desire to know the maximum workload an application can handle using the existing hardware.

The user may have duplicate I/O requests generated that functionally act as an increase in the workload of the application, and the user may observe the actual effect the increase would have on the application (e.g., lag, load times, errors, etc.). By doing so, physical storage assigned to a software application may be improved by knowing the maximum workload an application can handle before the physical storage is overburdened with I/O requests that, in turn, may hinder performance of the application. Additionally, a computer knowing the maximum workload of an application and limiting such overworking conditions before they occur may increase the speed of the computer.

In some embodiments, an amplification number may be input in a storage subsystem interface. In some embodiments, a user may input the amplification number into the storage subsystem. In some embodiments, the user may input an amplification number in an application (e.g., a webpage, a word processor, a spreadsheet, a media player, etc.). In some embodiments, the amplification number may be a part of a stand-alone application that modifies the workload of the application.

A processor in a storage subsystem may receive an original I/O request (e.g., a read and/or write request) from an application. In some embodiments, the processor may be a dedicated processor for receiving original I/O requests. In some embodiments, the processor may be any processor communicatively coupled to the storage subsystem. In some embodiments, the storage subsystem may receive one or more original I/O requests. The processor may determine, in response to the amplification number being input, to duplicate the original I/O request one or more times. The processor may generate one or more duplicate I/O requests of the original I/O request.

In some embodiments, the amount of the one or more duplicate I/O requests may correspond to the amplification number. The processor may store the original I/O request in a general address space in the storage subsystem (e.g., a section of the storage subsystem partitioned off to house and execute original I/O requests). The processor may also store the one or more duplicate I/O requests in a reserved address space in the storage subsystem (e.g., a section of the storage subsystem partitioned off, and separate from the general address space, to house and execute duplicate I/O requests). The processor may execute the original I/O request and the one or more duplicate I/O requests.

In some embodiments, the processor may be in a server environment. In some embodiments, the original I/O request may be executed in the general address space simultaneously with the execution of the one or more duplicate I/O requests in the reserved address space.

For example, a user (e.g., an administrator, a web developer, etc.) may be in charge of a webpage. To duplicate a number of read I/O requests associated with the webpage, the user may input an amplification number of 0.2 into a hard-drive housing the webpage. The webpage may then send 100 read I/O requests to be processed by the hard-drive located in a computer. The hard-drive may receive the 100 read I/O requests and determine that 20 more read I/O requests may be generated. The hard-drive may determine 20 more read I/O requests are needed by the amplification number (i.e., 100×0.2=20). The 20 more read I/O requests may be generated by the hard-drive duplicating 20 of the original 100 read I/O requests. In some embodiments, the user may input the amplification number into a computer system that hosts the webpage.

The hard-drive may then store the original 100 read I/O requests in a general address space that has been partitioned off in the hard-drive (e.g., by a virtual machine, hypervisor, etc.). The hard-drive may additionally store the 20 duplicate read I/O requests in a reserved address space that has been partitioned off in the hard-drive. The hard-drive may then execute all 120 read I/O requests at once (e.g., the 100 original read I/O requests and the 20 duplicate read I/O requests). Executing all 120 read I/O requests at once may increase the time required to load the webpage (e.g., slow the loading) of the webpage. For example, if loading the webpage took an additional 2 seconds, the user may determine the delay to be unacceptable. In some embodiments, the user may input multiple amplification numbers to determine an acceptable workload for the application. In some embodiments, the processor may provide the amplification number (e.g., by a random number generator, sequential numbering, etc.).

In some embodiments, when generating the one or more duplicate I/O requests, the processor may identify a block-size of the original I/O requests and duplicate the block-size of the original I/O request identically to each of the one or more duplicate I/O requests. For example, a write I/O request may have a 4 kB block-size. A hard-drive may then generate all duplicate write I/O requests having the same 4 kB block-size.

In some embodiments, the processor may continue to identify a storage address of the original I/O request. In some embodiments, the storage address may direct the original I/O request to be stored in the general address space of the storage subsystem. The processor may then generate a tag. In some embodiments, the tag may be a fixed offset value (e.g., an integer that when added to the storage address changes the location of the storage address). The processor may add the tag to the storage address of the original I/O request. In some embodiments, adding the tag to the storage address of the original I/O request may create a new storage address. The processor may then store the one or more duplicate I/O requests in the new storage address. In some embodiments, the new storage address directs the one or more duplicate I/O requests to be stored in the reserved address space of the storage subsystem.

For example, a server may receive a read I/O request from a media player and the server may identify the storage address of the read I/O request as "register int=5." The server may then generate a tag "new register=(register int)+3," and add the tag to the storage address creating the new storage address of "new register=8." The server may generate all duplicate read I/O requests with the new storage address of "new register=8." The server may add the integer 3 to the original storage address because the value may change the location of any original storage address to a location in a reserved address space. In some embodiments, the new storage address space may only be used for duplicate I/O requests, and the original I/O request may still be stored in the original address space. In some embodiments, this may allow the duplicate I/O requests to be executed for the purpose of monitoring performance impact, while maintaining data security and partitioning such that the duplicate requests do not change actual data.

In some embodiments, the processor may determine that the original I/O request type is a read operation (sometimes referred herein as a read I/O request). The processor may then duplicate the read operation of the original I/O request to generate the one or more duplicate I/O requests. In some embodiments, duplicate read I/O requests may be stored in the general address space because they do not alter the behavior of the behavior of the storage subsystem (i.e., because read requests do not modify the read data). In some embodiments, the processor may determine that the original I/O request type is a write operation (sometimes referred herein as a write I/O request). The processor may then duplicate the write operation of the original I/O request to the one or more duplicate I/O requests.

For example, a disk hard-drive may receive, from an application, an I/O request to write data (e.g., a write I/O request) to each platter of the disk hard-drive. The disk hard-drive may determine that the I/O request type is a write operation. The disk hard-drive may additionally note that an amplification number may have been entered by a user, and may, in response to the amplification number, generate duplicate I/O requests with the same write operation as the I/O request received from the application.

In some embodiments, the write operation, upon execution, may alter the behavior of the storage subsystem (e.g., change the data in the storage subsystem). In these embodiments, the processor may alter the behavior of the reserved address space of the storage subsystem. The processor may hide the altered behavior of the storage subsystem from the user. The processor may also provide the user with an observational performance impact report, as detailed in operation 216 of FIG. 2. In some embodiments, the observational performance impact report includes the effect of the one or more duplicate I/O requests on the storage subsystem after execution of the one or more duplicate I/O requests. The processor may determine a maximum workload for the application from the observational performance impact report, as detailed in decision block 218 of FIG. 2. In some embodiments, the processor may determine the maximum workload from the observational performance impact report by the user inputting pre-existing preferences on application performance load time, picture quality, etc.).

For example, a server may receive a request from a webpage to write information (e.g., data) loaded from an online survey that was completed by a user. The server may identify the request as a write operation that will alter the appearance of the webpage in response to the user's survey answers. The server may duplicate the request with the write information and store the duplicate request in a space reserved for duplicate requests and the original request in a space designated for original requests. The server may allow the original request to write the information to the space designated for original requests and the duplicate request to write the information to the reserved space.

The server may allow both the designated space and the reserved space to be altered by the write information. The server may hide the altered behavior of the reserved space from the user. This may be done to ensure that, upon execution of the write request, the webpage is not updated redundantly, which may cause a loading error of the webpage. The server may then execute both the original request and the duplicate request at the same time. The user may observe that the webpage with the doubled workload (e.g., the original request and the duplicate being processed by the server) may load in two seconds, and the user (or the processor) may determine that the load time is acceptable.

The user may additionally be provided with a metric report that indicates that the load time of the webpage is now two seconds with the doubled workload. The user may determine that the maximum workload for the webpage is two requests, as any more requests may result in a longer load time and therefore be unacceptable. In some embodiments, the server may automatically determine the maximum workload of the webpage (e.g., using thresholds set by the user for one or more performance metrics, such as load time).

In some embodiments, determining the effect of the one or more duplicate I/O requests may include measuring the effects of the one or more duplicate I/O requests on one or more computer components. In some embodiments, the one or more computer components may include, among other things, a memory, a file system, and a network. Following the above-mentioned example, when executing the original request and the duplicate request, the webpage may be hindered during the processing of the requests (e.g., because the requests are blocking requests). This may be because the server processing the requests is additionally impeding the network speed at which the webpage is receiving the processed requests. The aggregate of the effects may cause the webpage to perform at a less than satisfactory rate as observed and determined by the user.

Figure 2:
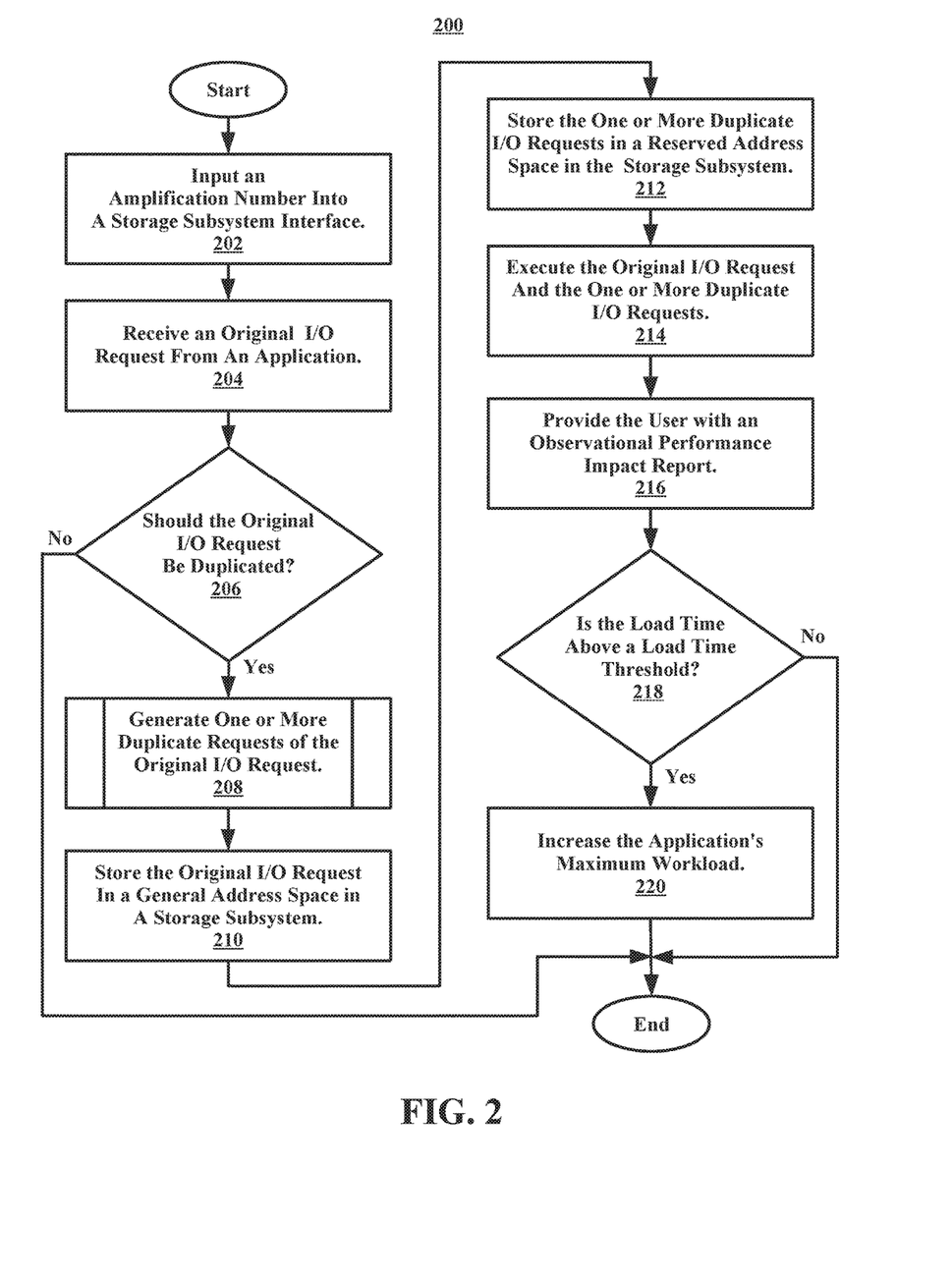
FIG. 2 illustrates a flowchart of an example method for executing original I/O requests and one or more duplicate I/O requests in a storage subsystem, in accordance with embodiments of the present disclosure.

In some embodiments, upon determining the maximum workload for the application, the general address space and the reserved address space may be combined to increase the maximum workload for the application, as detailed in operation 220 of FIG. 2. For example, a USB drive may be used as a storage device for a laptop computer. The USB drive may be virtually split (e.g., partitioned) to include a general address space and a reserved address space. A user may input an amplification number of 10, increasing the workload of an application on the laptop ten-fold. The user may observe that the application now loads 0.5 seconds slower. The user may determine this to be the longest acceptable delay for the application and deem a workload that is ten-fold higher as the maximum workload for the application. Upon the determination, the USB drive may combine the general address space and the reserved address space in order to ensure that the application will properly function with a ten times workload without causing the application to load any slower than 0.5 seconds.

In another example, a user may determine in a word processing application that the maximum number of documents that should be open at any one time is 10. After determining the maximum number of documents, if the user or another user tries to open more than 10 documents, a processor may stop them or warn them that doing so is likely to decrease the word processing application's performance.

In some embodiments, the user may be prompted by the processor to combine (e.g., merge) the general address space and the reserved address space. In some embodiments, the processor may automatically combine the general address space and the reserved address space. Combining the two address spaces may be done so that the storage subsystem is not flooded with I/O requests that would render the application unresponsive, and so that the maximum amount of computing resources is made available to the application.

Figure 1:
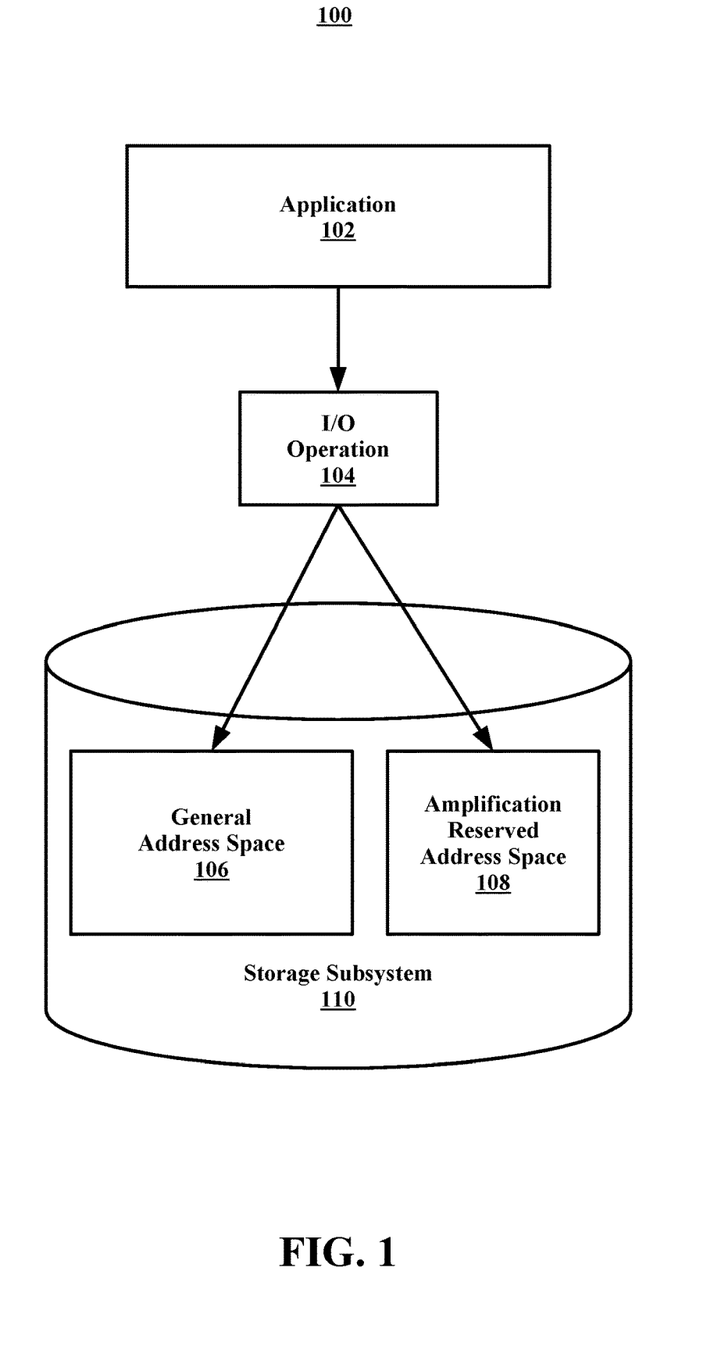
FIG. 1 illustrates a block diagram of an example system for storing original I/O requests and one or more duplicate I/O requests, in accordance with embodiments of the present disclosure.

Referring now to FIG. 1, which illustrates an example system 100 for storing original I/O requests and one or more duplicate I/O requests, according to embodiments of the present disclosure. In some embodiments, the system 100 may be a device (e.g., a computer, smartphone, smartwatch, computer, radio, etc.). The system 100 may include an application 102. In some embodiments, the application 102 may receive a workload and send an I/O operation 104 (e.g., a read I/O request and/or a write I/O request) to a storage subsystem 110 that may also be included in the system 100.

In some embodiments, the storage subsystem 110 may include a general address space 106 and an amplification reserved address space 108. In some embodiments, when receiving the I/O operation 104, if a user has input an amplification number, the storage subsystem may duplicate the I/O operation 104. In some embodiments, the I/O operation 104 is directed to and stored in the general address space 106, and the duplicate I/O operation may be directed to and stored in the amplification reserved address space. In some embodiments, the number of duplicate I/O operations generated by the storage subsystem may correspond to the input amplification number minus the amount of original I/O operations.

For example, a user may input an amplification number of three and 10 original I/O requests are received by the storage subsystem. The storage subsystem may multiply the original I/O requests and determine that 30 total I/O requests are needed (e.g., 3×10=30). The storage subsystem may recognize that 10 original I/O requests already exist and therefore only generate 20 duplicate I/O requests in order to have 30 total I/O requests.

In some embodiments, the number of duplicate I/O operations generated by the storage subsystem may correspond directly to the amplification number plus the amount of original I/O operations. Following the example above, the storage subsystem may multiply the 10 original I/O requests by three (e.g., the amplification number) and determine that 30 new I/O requests are additionally needed. The storage subsystem may add the 10 original I/O requests to the 30 new I/O requests and determine that 40 total I/O requests are needed. In some embodiments, once all the I/O requests (e.g., original I/O requests and duplicate I/O requests) are received and/or generated, the I/O requests may be executed simultaneously and the impact on performance may be monitored.

Referring now to FIG. 2, illustrated is a flowchart of an example method 200 for executing original I/O requests and one or more duplicate I/O requests in a storage subsystem, in accordance with embodiments of the present disclosure. In some embodiments, a user may perform one or more operations in the method 200. In some embodiments, a computer system may perform one or more operations in the method 200.

The method 200 may start at operation 202, where a user may input an amplification number into a storage subsystem interface. After operation 202, the method 200 may continue to operation 204 where a processor in a storage subsystem may receive an original I/O request from an application. For example, a disc jockey may have a music player open on a computer and the disc jockey may want to know how many songs they can mix together before there is substantial lag in the mixed songs. The disc jockey may input an amplification number of 5, meaning that the disc jockey would like to know how the music player would react to 5 songs processing and executing at once. The disc jockey may then select a first song to be played by the music player and the music player may send the first song data (e.g., an original I/O request) to a storage subsystem of the computer to be processed and executed.

In some embodiments, after receiving an original I/O request from the application at operation 204, the method 200 may proceed to decision block 206. At decision block 206, it may be determined, in response to the amplification number being input, to duplicate the original I/O request one or more times. In some embodiments, if an amplification number was not input, the processor may at decision block 206, determine not to duplicate the original I/O request and the method 200 may end.

In some embodiments, after decision block 206, if it was determined that the original I/O request may be duplicated, the method 200 may proceed to operation 208. At operation 208, the processor may generate one or more duplicate I/O requests of the original I/O request. In some embodiments, the number of times the original I/O request may be duplicated may correspond to the amplification number.

Following the above example, the storage subsystem of the computer may take the first song request and multiply it by the amplification number (e.g., 1×5=5), and determine that there should be five total song requests. The storage subsystem may subtract the first song from the total (e.g., 5−1=4) and determine that four duplicate song requests need to be generated (e.g., four duplicates of the first song).

In some embodiments, after operation 208, the method 200 may proceed to operation 210 where the processor may store the original I/O request in a general address space in the storage subsystem. In some embodiments, after operation 210, the method 200 may proceed to operation 212 where the processor may store the one or more duplicate I/O requests in a reserved address space in the storage subsystem. In some embodiments, the processor may simultaneously store the original I/O request in the general address space and the one or more duplicate I/O requests in the reserved address space.

In some embodiments, after operation 212, the method 200 may proceed to operation 214. At operation 214, the processor may execute the original I/O request and the one or more duplicate I/O requests. In some embodiments, the processor may execute the original I/O request and the one or more duplicate I/O requests at the same time (e.g., simultaneously). In some embodiments, the processor may execute the original I/O request and the one or more duplicate I/O requests within a predetermined amount of time after storing the original I/O request and the one or more duplicate I/O requests.

For example, a storage subsystem may receive an original I/O request and an amplification number of 100. The storage subsystem may wait 0.5 seconds before executing the original I/O request. The waiting before execution may allow the storage subsystem time to duplicate the original I/O request 100 times. After the 0.5 seconds the storage subsystem may execute the original I/O request and the 100 duplicate I/O requests. In some embodiments, after operation 214, the method 200 may end.

Figure 3:
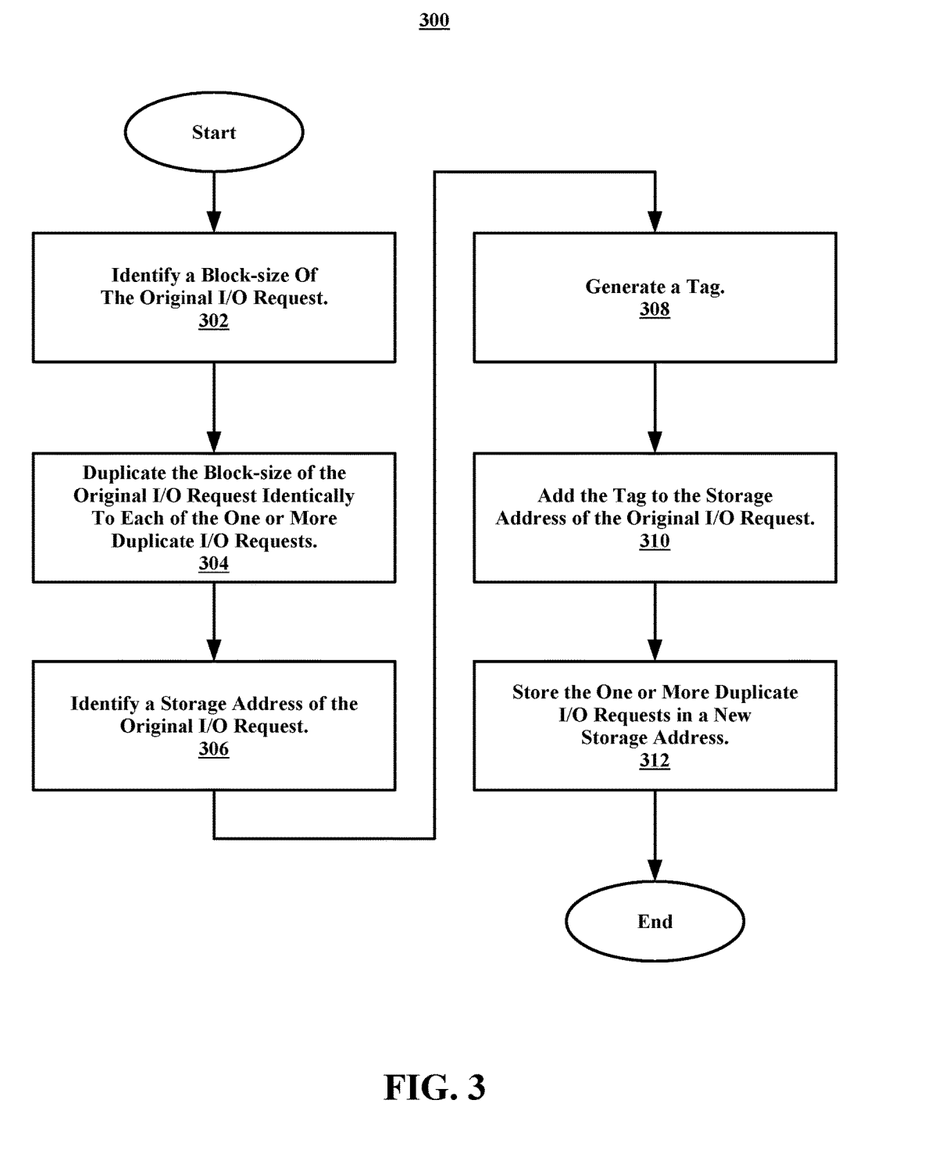
FIG. 3 illustrates a flowchart of an example method for generating one or more duplicate I/O requests, in accordance with embodiments of the present disclosure.

Referring now to FIG. 3, illustrated is a flowchart of an example method 300 for generating one or more duplicate I/O requests, in accordance with embodiments of the present disclosure. In some embodiments, a user may perform one or more operations in the method 300. In some embodiments, a computer system may perform one or more operations in the method 300.

The method 300 may begin at operation 302 where a processor in a storage subsystem may identify a block-size of the original I/O request. After operation 302, the method 300 may proceed to operation 304. At operation 304, the processor may duplicate the block-size of the original I/O request identically to each of the one or more duplicate I/O requests. For example, a compact disc controller may receive a write operation I/O request. The compact disc controller may identify the write operation as being 5 MB in size. The compact disc controller may then, when input with an amplification number, generate all duplicate I/O requests as write operations that are 5 MB in size.

In some embodiments, after operation 304, the method 300 may proceed to operation 306. At operation 306, the processor may identify a storage address of the original I/O request. In some embodiments, the storage address may direct the original I/O request to be stored in the general address space of the storage subsystem (e.g., in a partitioned portion of the compact disc controller). After operation 306, the method 300 may proceed to operation 308 where the processor may generate a tag (e.g., that may designated a duplicate I/O request to a reserved address space). In some embodiments, the tag may be a fixed offset value (e.g., integer, hexadecimal, binary, etc.).

In some embodiments, after operation 308, the method 300 may proceed to operation 310. At operation 310 the processor may add the tag to the storage address of the original I/O request. In some embodiments, adding the tag to the storage address of the original I/O request may create a new storage address. After operation 310, the method 300 may proceed to operation 312 where the processor may store the one or more duplicate I/O requests in the new storage address. In some embodiments, the new storage address may direct the one or more duplicate I/O requests to be stored in the reserved address space of the storage subsystem.

For example, an external hard-drive may receive an I/O request from a video player. The external hard-drive may identify the storage address of the data being requested from the I/O request as "address_integer=3." The external hard-drive may then be programmed to generate a tag that may be "new_storage_address=address_integer+10." The external hard-drive may then add the tag to the storage address of the I/O request making the new storage address the integer "13" (e.g., 10+3=13). The integer of 10 added by the tag may indicate to the external hard-drive that any storage address above 10 may be stored in a reserved storage space in the external hard-drive. The external hard-drive may then duplicate the I/O request with the new storage address of "13," and store all the duplicate requests in the reserved storage space. The original I/O request received from the video player may be stored in the original storage address of "3," which may be in a general storage space reserved for original I/O requests.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
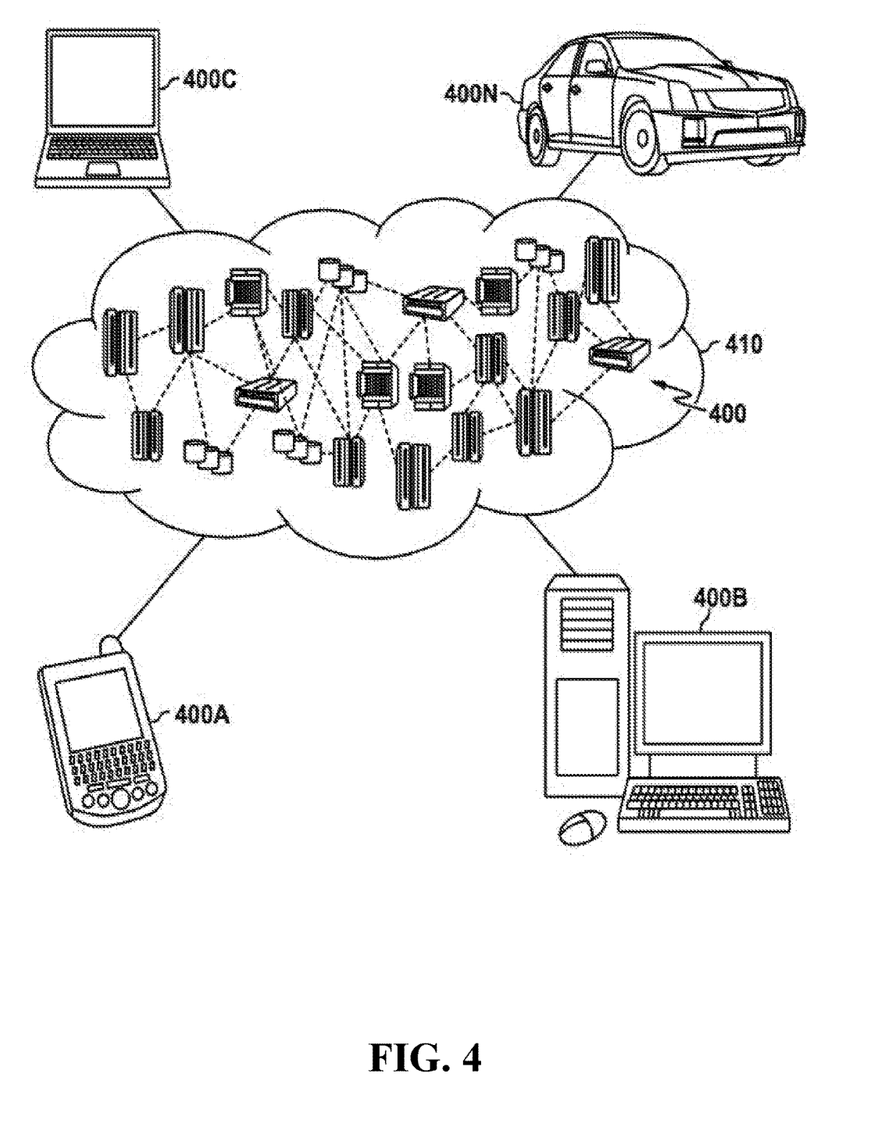
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
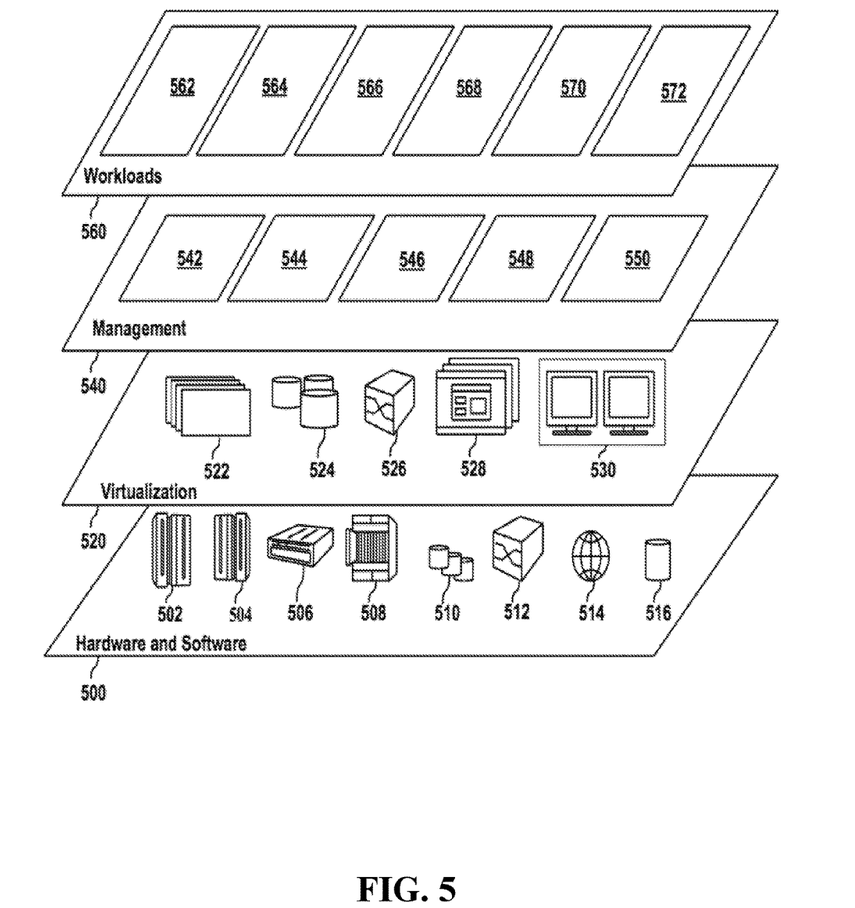
FIG. 5 depicts abstraction model layers, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the invention are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and identifying an identifiable media 572.

Figure 6:
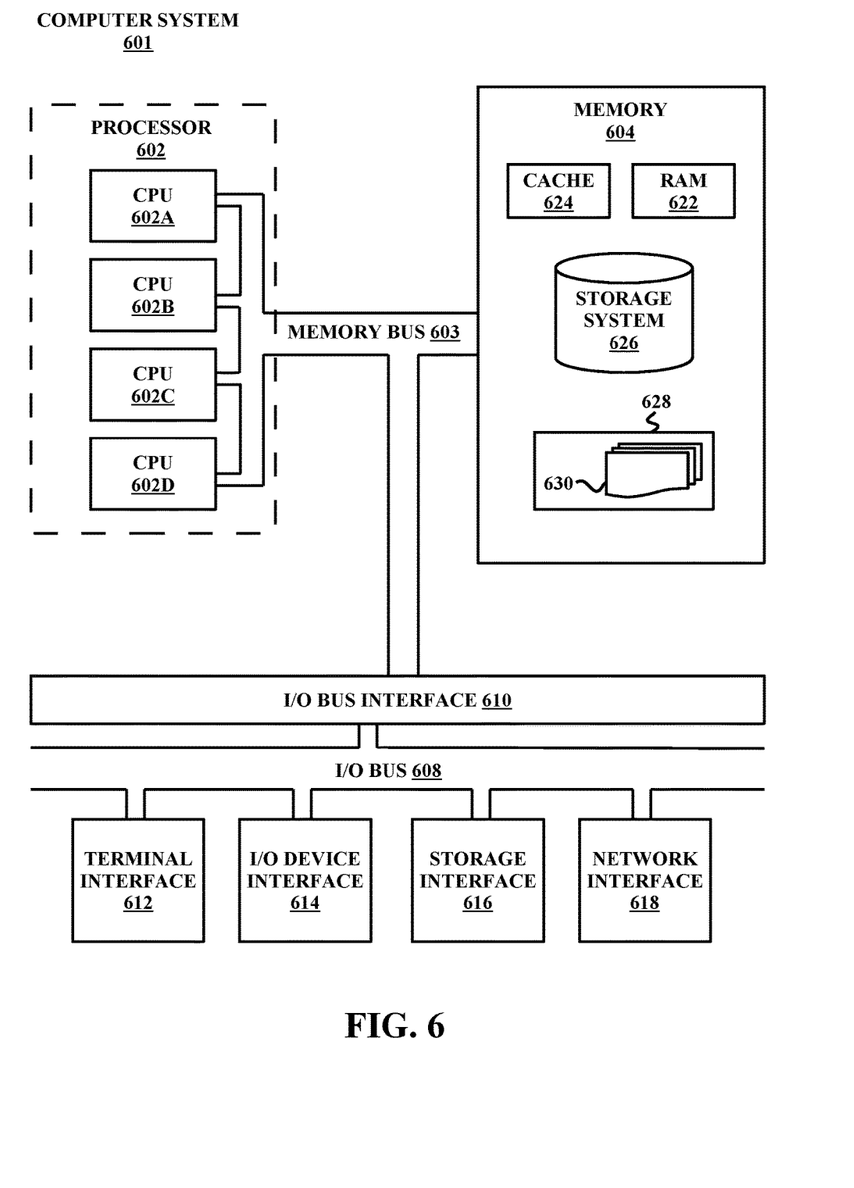
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
inputting an amplification number into a storage subsystem interface;
receiving, by a processor in a storage subsystem, an original input/output (I/O) request from an application, wherein the application is a webpage;
determining, in response to the amplification number being input, to duplicate the original I/O request one or more times;
generating one or more duplicate I/O requests of the original I/O request for simultaneous execution with the original I/O request, wherein the amount of the one or more duplicate I/O requests corresponds to the amplification number;
storing the original I/O request in a general address space in the storage subsystem;
storing the one or more duplicate I/O requests in a reserved address space in the storage subsystem;
executing, simultaneously, the original I/O request in the general address space and all of the one or more duplicate I/O requests in the reserved address space;
determining that the original I/O request type is a write operation wherein the write operation alters the behavior of the storage subsystem;
duplicating the write operation of the original I/O request to the one or more duplicate I/O requests;
altering the behavior of the reserved address space of the storage subsystem by executing the write operation, wherein altering the behavior of the reserved address space includes changing a display feature of the webpage; and
merging the general address space and the reserved address space together, wherein the general address space and the reserved address space are automatically merged, upon meeting a performance metric threshold, by removing a virtual partition separating the general address space and the reserved address space.

2. The method of claim 1, wherein generating the one or more duplicate I/O requests comprises:
identifying a block-size of the original I/O request; and
duplicating the block-size of the original I/O request identically to each of the one or more duplicate I/O requests.

3. The method of claim 2, further comprising:
identifying a storage address of the original I/O request, wherein the storage address directs the original I/O request to be stored in the general address space of the storage subsystem;
generating a tag, wherein the tag is a fixed offset value;
adding the tag to the storage address of the original I/O request, wherein adding the tag to the storage address of the original I/O request creates a new storage address; and
storing the one or more duplicate I/O requests in the new storage address, wherein the new storage address directs the one or more duplicate I/O requests to be stored in the reserved address space of the storage subsystem.

4. The method of claim 1, further comprising:
hiding the altered behavior of the reserved address space of the storage subsystem from the user, wherein hiding the altered behavior of the reserved address space includes not displaying the changed display feature of the webpage to the user and displaying a loading delay of the webpage to the user, wherein the changed display feature of the webpage is an alteration to the appearance of the webpage, and wherein the loading delay is in response to the alteration to the appearance of the webpage;
providing the user with an observational performance impact report, wherein the observational performance impact report includes the effect of the one or more duplicate I/O requests on the storage subsystem after execution of the one or more duplicate I/O requests; and
determining, from the observational performance impact report, a maximum workload for the webpage.

5. The method of claim 4, wherein the effect of the one or more duplicate I/O requests includes the effects of the one or more duplicate I/O requests on one or more computer components, wherein the one or more computer components include a memory, a file system, and a network.

6. The method of claim 4, wherein the general address space and the reserved address space are automatically combined to increase the maximum workload for the webpage.

7. A system comprising:
a memory; and
a processor in communication with the memory, the processor being configured to perform operations comprising:
inputting an amplification number into a storage subsystem interface;
receiving an original input/output (I/O) request from an application, wherein the application is a webpage;
determining, in response to the amplification number being input, to duplicate the original I/O request one or more times;
generating one or more duplicate I/O requests of the original I/O request for simultaneous execution with the original I/O request, wherein the amount of the one or more duplicate I/O requests corresponds to the amplification number;
storing the original I/O request in a general address space in a storage subsystem;
storing the one or more duplicate I/O requests in a reserved address space in the storage subsystem;
executing, simultaneously, the original I/O request in the general address space and all of the one or more duplicate I/O requests in the reserved address space;
determining that the original I/O request type is a write operation wherein the write operation alters the behavior of the storage subsystem;
duplicating the write operation of the original I/O request to the one or more duplicate I/O requests;
altering the behavior of the reserved address space of the storage subsystem by executing the write operation, wherein altering the behavior of the reserved address space includes changing a display feature of the webpage; and
merging the general address space and the reserved address space together, wherein the general address space and the reserved address space are automatically merged, upon meeting a performance metric threshold, by removing a virtual partition separating the general address space and the reserved address space.

8. The system of claim 7, wherein generating the one or more duplicate I/O requests comprises:
identifying a block-size of the original I/O request; and
duplicating the block-size of the original I/O request identically to each of the one or more duplicate I/O requests.

9. The system of claim 8, further comprising:
identifying a storage address of the original I/O request, wherein the storage address directs the original I/O request to be stored in the general address space of the storage subsystem;
generating a tag, wherein the tag is a fixed offset value;
adding the tag to the storage address of the original I/O request, wherein adding the tag to the storage address of the original I/O request creates a new storage address; and
storing the one or more duplicate I/O requests in the new storage address, wherein the new storage address directs the one or more duplicate I/O requests to be stored in the reserved address space of the storage subsystem.

10. The system of claim 7 further comprising:
hiding the altered behavior of the reserved address space of the storage subsystem from the user, wherein hiding the altered behavior of the reserved address space includes not displaying the changed display feature of the webpage to the user and displaying a loading delay of the application to the user, wherein the changed display feature of the webpage is an alteration to the appearance of the webpage, and wherein the loading delay is in response to the alteration to the appearance of the webpage;
providing the user with an observational performance impact report, wherein the observational performance impact report includes the effect of the one or more duplicate I/O requests on the storage subsystem after execution of the one or more duplicate I/O requests; and
determining, from the observational performance impact report, a maximum workload for the webpage.

11. The system of claim 10, wherein the effect of the one or more duplicate I/O requests includes the effects of the one or more duplicate I/O requests on one or more computer components, wherein the one or more computer components include a memory, a file system, and a network.

12. The system of claim 10, wherein the general address space and the reserved address space are automatically combined to increase the maximum workload for the webpage.

13. A computer program product comprising a non-transitory computer readable storage medium having program instructions embodied therewith, the program instructions executable by a processor to cause the processor to perform a method, the method comprising:
inputting an amplification number into a storage subsystem interface;
receiving an original input/output (I/O) request from an application, wherein the application is a webpage;
determining, in response to the amplification number being input, to duplicate the original I/O request one or more times;
generating one or more duplicate I/O requests of the original I/O request for simultaneous execution with the original I/O request, wherein the amount of the one or more duplicate I/O requests corresponds to the amplification number;
storing the original I/O request in a general address space in a storage subsystem;
storing the one or more duplicate I/O requests in a reserved address space in the storage subsystem; and
executing, simultaneously, the original I/O request in the general address space and all of the one or more duplicate I/O requests in the reserved address space;
determining that the original I/O request type is a write operation wherein the write operation alters the behavior of the storage subsystem;
duplicating the write operation of the original I/O request to the one or more duplicate I/O requests;
altering the behavior of the reserved address space of the storage subsystem by executing the write operation, wherein altering the behavior of the reserved address space includes changing a display feature of the webpage; and
merging the general address space and the reserved address space together, wherein the general address space and the reserved address space are automatically merged, upon meeting a performance metric threshold, by removing a virtual partition separating the general address space and the reserved address space.

14. The computer program product of claim 13, wherein generating the one or more duplicate I/O requests comprises:
identifying a block-size of the original I/O request; and
duplicating the block-size of the original I/O request identically to each of the one or more duplicate I/O requests.

15. The computer program product of claim 14, further comprising:
identifying a storage address of the original I/O request, wherein the storage address directs the original I/O request to be stored in the general address space of the storage subsystem;
generating a tag, wherein the tag is a fixed offset value;
adding the tag to the storage address of the original I/O request, wherein adding the tag to the storage address of the original I/O request creates a new storage address;
storing the one or more duplicate I/O requests in the new storage address, wherein the new storage address directs the one or more duplicate I/O requests to be stored in the reserved address space of the storage subsystem;
hiding the altered behavior of the reserved address space of the storage subsystem from the user, wherein hiding the altered behavior of the reserved address space includes not displaying the changed display feature of the webpage to the user and displaying a loading delay of the webpage to the user, wherein the changed display feature of the webpage is an alteration to the appearance of the webpage, and wherein the loading delay is in response to the alteration to the appearance of the webpage;
providing the user with an observational performance impact report, wherein the observational performance impact report includes the effect of the one or more duplicate I/O requests on the storage subsystem after execution of the one or more duplicate I/O requests; and
determining, from the observational performance impact report, a maximum workload for the webpage.

16. The computer program product of claim 15, wherein the general address space and the reserved address space are automatically combined to increase the maximum workload for the webpage.

\* \* \* \* \*